United States Patent Office 3,493,552
Patented Feb. 3, 1970

3,493,552
METAL SEALANT CONTAINING AMINO ACRYLIC ESTER
Charanjit Rai, Somerset, N.J., and William James Keillor, Westchester, Ill., assignors to Broadview Chemical Corporation, a corporation of Illinois
No Drawing. Continuation-in-part of application Ser. No. 561,381, June 29, 1966. This application Mar. 24, 1969, Ser. No. 809,986
Int. Cl. C08f 3/64
U.S. Cl. 260—89.5                                      7 Claims

ABSTRACT OF THE DISCLOSURE

An alkylaminoalkyl alcohol ester of an acrylic acid is used as a room temperature curing monomer in a shelf stable fast curing sealant composition which contains a hydroperoxide catalyst and cures when placed between facing ferrous metal surfaces.

RELATION TO THE CO-PENDING APPLICATIONS

This application is a continuation-in-part of my co-pending application Ser. No. 561,381 entitled "Metal Sealant Containing Amino Acrylic Ester" filed June 29, 1966, and now abandoned.

BACKGROUND OF THE INVENTION

Field of the invention

This invention relates to sealants containing a liquid monomer and a catalyst. The sealants are shelf stable but are capable of setting up at room temperature when placed between closely facing ferrous metal surfaces.

Prior art

Sealant compositions are liquid solventless adhesives usually used for adhering metal surfaces to each other. They can be put to a variety of specific uses such as for adhering a nut to a bolt, mounting a bearing, adhering metal slip fits, abutting joints and threaded joints such as on pipes and pipe fittings. They are shelf stable under normal storage conditions but are triggered to set up or polymerize by placing them between closely metal surfaces. Heretofore commercial sealants have used as the basic monomer a diacrylic ester of a polyethylene glycol or the like.

During the prosecution of the above identified copending application, Graves U.S. 2,138,763, has been considered as a prior art reference. Graves teaches the preparation of a number of kinds of amino alcohol esters of methacrylic acid and their polymerization in solution by exposure of solutions of the ester to ultraviolet light or by heating with polymerization cataylsts such as benzoyl peroxide. The polymerization is slow because of inhibition by the amino group. Although Graves incidentally suggests use of the resulting polymer in adhesive applications, the polymer is not suitable as a room temperature setting adhesive.

Further, attempts have been made to provide sealant compositions from a variety of different monomers with little or no success. For example, methylmethacrylate, which is one of the more common acrylic monomers, is not a room temperature reactive monomer. This holds true for almost all other monomers. In order to try to activate such monomers, accelerators have been used but these have been found to either render the composition unstable or else they do not have the desired accelerator effect.

The one successful commercial system which has used the diacrylate of polyethylene glycol or the like as the monomer is a shelf stable sealant composition. Such shelf stable sealant compositions are provided in a full range of varying strengths, viscosity, thixotropy and curing or setting rates. The range of products can include very fast curing sealants of various ultimate strengths as well as slower curing materials also of various ultimate strengths. Such sealant compositions usually include an acrylic monomer which is capable of being cured at room temperature within the desired period of time.

SUMMARY OF THE INVENTION

This invention provides a sealant composition which uses an acrylic ester of an alkylaminoalkyl alcohol as a room temperature setting monomer containing a hydroperoxide catalyst, which can be either an organic hydroperoxide or hydrogen peroxide, for setting the monomer up. The monomer itself functions as the solvent for any soluble ingredients in the sealant, so significant amounts of volatile solvent are not used and there is no need for removal of volatile solvents to produce a bond.

It is an object of this invention to provide new and useful liquid sealant compositions which will set up at room temperature in contact with closely facing metal surfaces within a reasonable time to provide a good bond between the surfaces.

Another object of this invention is to provide a high strength sealant composition which has good stability and an acceptable or desired rate of room temperature cure.

A still further object of this invention is to provide a new and useful sealant composition employing a highly advantageous room temperature reactive or curing monomer system.

Other objects of this invention will be apparant from the descriptions given herein.

DESCRIPTION OF THE PREFERRED EMBODIMENTS

Briefly, the present invention involves the use of an acrylic ester of an alkylaminoalkyl alcohol as a room temperature reactive monomer in a sealant composition. Especially useful esters have the following formula:

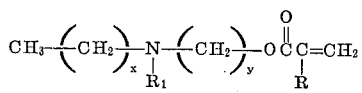

wherein $x$ is an integer 0 to 5, inclusive, $y$ is an integer 1 to 6, inclusive, and $R_1$ is hydrogen or $C_1$ to $C_6$ alkyl. The nature of the R group of the acrylic portion of the ester is unimportant. For example, R can be hydrogen, halogen, hydroxy, cyano, or substituted or unsubstituted saturated or unsaturated hydrocarbon. Preferably, R is hydrogen, halogen or lower alkyl, i.e. $C_1$ to $C_6$, because of the more ready availability of such acrylic acids and/or their alkylaminoalkyl alcohol esters. The halogens are chlorine, iodine, fluorine and bromine.

To prepare the present sealant compositions, it is merely necessary to mix a suitable amount of hydroperoxide catalyst with the sealant monomer, including the acrylic ester of an alkylaminoalkyl alcohol. Metal containers should not be used because of the chance of premature polymerization. It has been found that the hyperoxide catalyst, e.g. organic hydroperoxide can usually be used alone, e.g. in amounts of .1 to 15% or more, and preferably 1 to 8%, in the sealant composition to cause the ester to set up within a reasonable period of time, e.g. less than 6 hours and preferably less than 3 or 4 hours, at room temperature (70° F.), when the composition is used as a sealant. Examples of suitable organic hydroperoxide are cumene hydroperoxide, t-butyl hydroperoxide, methylethylketone hydroperoxide, tetralin hydroperoxide, 2,5-dimethylhexyl-2,5-dihydroperoxide, and the like.

More specifically, the room temperature reactive monomers of the present sealants include, but are not limited to, the following: butylaminoethyl methacrylate, dimethyl aminoethyl cyanoacrylate or methacrylate or chloroacrylate, dihexyl aminomethyl acrylate, amylaminoethyl ethacrylate, di(t-butyl) aninoethyl methacrylate, di(t-butyl) aminohexyl methacrylate, hexylaminohexyl pentacrylate, methylaminomethyl methacrylate, as well as other esters of acrylic acids and alkylaminoalkanols.

The present monomers may be used in mixtures with other monomers, including other room temperature reactive acrylic monomers such as an acrylic poly-ester, e.g. di-, tri-, and tetra-, esters of a polyol, e.g. polyethylene glycol as described by L. W. Kalinowski in U.S. Patent No. 3,249,656. Other copolymerizable acrylic monomers may also be used in the mixtures, which monomers are not truly room temperature reacting by themselves, e.g. acrylic ester methyl metharcylate, butyl methacrylate, hydroxyethylmethacrylate or acrylate, etc. The disclosures of monomers and hydroperoxide catalysts and the specific examples of such monomers and catalysts described in the above-identified patent are hereby incorporated in this application by reference as examples of catalysts which are useful in the present sealants and monomers which can be mixed therewith, if desired.

It is intended that other monomers and even polymeric materials can also be included in the sealant compositions. Such other monomers can be those which are not readily initiated at room temperature and can be included to impart various desirable properties, e.g. for the purpose of varying the strength of the sealant. Such other monomers include generally the vinylic monomers and especially other acrylic monomers such as acrylic acid esters of mono- and polyhydric alcohols. Additionally, allylic monomers such as allyl alcohol, allyl methacrylate and diallyl phthalate can be used, although some of these monomers are lacrimatious and it is preferred not to include them in large portions where the sealant is to be used in an unventilated area. Such vinyl monomers as divinyl-benzene, styrene and alphamethyl styrene can also be used, although these tend to seep through containers, especially polyethylene containers, so a more impervious container should be selected for the product. Polymeric materials and prepolymers soluble in the monomers can also be used to advantage; for example, the solid prepolymer of diallyl phthalate marketed under the tradename Dapon-35. Soluble polyesters and especially the liquid, including viscous, polyesters of a polyol such as diethylene glycol with fumaric or maleic acid, as well as such polyesters modified by the substitution of phthalic or other plyfunctional acids for part of the maleic and/or fumaric acid can also be used to advantage. Soluble polymethylmethacrylate and other soluble acrylic polymers can also be included. The soluble polymers and prepolymers can be used to increase the viscosity of the sealant composition and will often impart higher strength characteristics to the sealant.

Inhibitors or stabilizers can be added as needed to balance or prevent instability of the sealant. Hydroquinone is a preferred inhibitor and stabilizer because of its availability and effectiveness. Hydroquinone, in a total amount of 20 to 2000 p.p.m., more usually 60 to 600 p.p.m., will probably be sufficient to stabilize most sealant compositions containing the ester. Other conventional inhibitors or stabilizers for inhibiting polymerization of vinyl compounds can be used as will be apparent to those in the art.

In an advantageous form of the present invention, polymerization or cure rate accelerators can be included in the compositions, e.g. in amounts of .001 to 10% by weight and preferably 0.01 to 5% by weight based on total monomer in the sealant composition. Useful accelerators for stable compositions include such nitrogen-containing compounds as the alkoxy alkyl amines, alkylaminoalkyl amines, primary and secondary alkyl amines, cycloalkyl amines, and primary allylic amines. Other compounds which may be useful accelerators are alkylol amines, tertiary amines, organic amides, organic imides, ureas and cyclic ureas, pseudo-thioureas, heterocyclic compounds containing nitrogen in the heterocyclic ring, trialkylol amino compounds, amino acids, etc. In a preferred form of the present invention, an organic sulfimide, amide, imide or the like is used as a cocatalyst to further increase cured strength of the bond. The cocatalyst functions to provide a more complete cure.

The following examples are offered for the purpose of illustration of the invention and are not intended as limiting. In each example the recited ingredients were mixed in a small polyethylene bottle, and the bottle was then plugged with a dispenser cap having a drop-dispensing spout. The ingredients were mixed by shaking until a good solution was formed.

EXAMPLES 1 TO 23

In each example reported in the table below, the ingredients indicated were mixed with the accelerator or cocatalyst and catalyst being added seriatim as the last ingredients. The "Master Batch" contained 73.7% by weight polyethylene glycol dimethacrylate (averaging tetraethylene glycol dimethacrylate), 26.3% by weight diallyl phthalate prepolymer (solid prepolymer marketed under the name Dapon-35) and 0.0001% hydroquinone. The catalysts and cocatalysts are identified in the table and were used in amounts of about 2.5% and 0.3%, respectively unless otherwise indicated.

AMOUNTS OF INGREDIENTS IN EACH EXAMPLE

| Ingredients (percent) | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|
| Master Batch [1] | | | | | | | | | | | | | | | | | | | | | | | 20 |
| Dimethylaminoethyl methacrylate [1] | 20 | | | | | | | | | | | | | | | | | | | | | | |
| Cyclohexyl methacrylate [1] | 50 | 40 | 50 | 50 | 50 | 50 | 50 | 50 | 50 | 50 | 50 | 50 | 50 | 50 | 50 | 50 | 50 | 50 | 50 | 50 | 50 | 50 | 2 |
| | 50 | | | 50 | 50 | 50 | 50 | 50 | 50 | | | | | 50 | | | | | | 50 | 50 | 50 | |
| Tetrahydrofurfuryl methacrylate [1] | | 50 | | | | | | | | 50 | 50 | 50 | 50 | | | | | | | | | | |
| Polyethylene Glycol dimethacrylate [1] | | | | | | | | | | | | | | | 50 | 50 | 50 | | | | | | |
| n-Butyl methacrylate [1] | | | | | | | | | | | | | | | | | | 50 | 50 | | | | |
| Ethylene glycol dimethacrylate [1] | | 20 | | | | | | | | | | | | | | | | | | | | | 20 |
| Acrylic acid | | 1 | | | | | | | | | | | | | | | | | | | | | 0.5 |
| Catalysts: | | | | | | | | | | | | | | | | | | | | | | | |
| Cumene hydroperoxide | X | X | X | X | | | | | | | | | | | | | | | | | | | X |
| t-Butyl hydroperoxide | | | | | X | X | X | X | X | X | X | X | X | X | X | X | X | X | X | X | X | X | |
| Cocatalysts: | | | | | | | | | | | | | | | | | | | | | | | |
| Benzoic sulfimide | X | X | X | X | | | | | | | | | | | | | | | | | | | X |
| Triallyl cyanurate | | | | | | | | | | | | | | | | | | | | | | | X |
| N,N-dimethyl formamide | | | | | | | | | | | | | | 1.0 | | | | | | | | | |
| Accelerators: | | | | | | | | | | | | | | | | | | | | | | | |
| N,N-dimethyl aniline 1% | | | | | | 2 | | | | | | 1 | | | | 2 | | | | 2 | | | |
| N,N'-dimethyl triethylene | | | | | | | | | | | | | | | | | 2 | | | | | 2 | |
| Glycol diamine | | | | | | | 2 | | 2 | | | | | | | | | | | | | | |
| Diisopropyl amine | | | | | | | | 2 | | 2 | | | | | 2 | | | | | | | | |
| N-ethyl morpholine | | | | | | | | | 2 | | | | | | | | | 2 | | 2 | | | |
| N-aminopropyl morpholine | | | | | | | | | | | 2 | | 2 | | | | | 2 | | | | | |
| t-Butylamine | | | | | | | | | | | | | 2 | | | | | | | | | | |
| Allyl amine | | | | | | | | | | | | | | | | | | | 2 | | | 2 | |
| Ethylene glycol diamine | | | | | | | | | | | | | | | | | | | | | 2 | | |

[1] Amounts given as parts by weight.

The above examples were tested for initial cure time at room temperature, 24 hour room temperature bond strength, and shelf life or stability by the following procedures with the results reported in the table below:

Initial cure to "finger tight": 3 small drops of each formulation were dispensed on the exposed threads of each of a plurality of degreased ⅜–24, 1 inch medium carbon steel cap screws on each of which a degreased medium carbon steel nut had been threaded up close to the cap screw head. The nut was then backed off until it was within the area of threads to which the formulation had been applied. Each cap screw was then placed head down on a level surface and allowed to stand. A separate cap screw for each formulation was checked after expiration of a different preselected time interval; and when a nut was found to be "finger tight," i.e. the nut could not be manually turned relative to the cap screw without the aid of a wrench or other tool, the time was recorded.

24-hour room temperature cured bondstrength: 24 hours after treatment of a cap screw with the sealant or above the head of the cap screw was held in a vise with the shank of the cap screw disposed vertically. A torque wrench was applied to the nut, and the torque required to dislodge the nut was noted.

Stability: Each composition, in its polyethylene bottle, was aged in an oven maintained at about 81° to 82° C. for 90 minutes. If the composition gelled, this was noted. The absence of gelling indicates at least about 2–3 years shelf life for the composition at ambient temperatures.

TEST RESULTS

| Example | Time to "Finger Tight," min. | Torque, 24 hours, in. lb. | Stability at 82° C. (min.) |
|---|---|---|---|
| 1 | 45 | 197 | 90 |
| 2 | 40 | 330 | 90 |
| 3 | 50 | 210 | 90 |
| 4 | 50 | 232 | 90 |
| 5 | 140 | 120 | 90 |
| 6 | 90 | 119 | 90 |
| 7 | 20 | 215 | 90 |
| 8 | ² 120 | 148 | 90 |
| 9 | 15 | 220 | 90 |
| 10 | 20 | 186 | 90 |
| 11 | 35 | 190 | ³ NA |
| 12 | 20 | 192 | 90 |
| 13 | 20 | 233 | 90 |
| 14 | 50 | 153 | 90 |
| 15 | 75 | 195 | 90 |
| 16 | 20 | 183 | 90 |
| 17 | 50 | 197 | 90 |
| 18 | 20 | 93 | 90 |
| 19 | 20 | 109 | 90 |
| 20 | 20 | 189 | 90 |
| 21 | 20 | 165 | 90 |
| 22 | 20 | 146 | 90 |
| 23 | 85 | 267 | ⁴ 60 |

² Not previously checked.
³ Not available—no test made.
⁴ Gelled at 90 min.

The temperature conditions during the preparation and testing of all sealant compositions herein were in the range of about 70° F. to 75° F.

EXAMPLE 24

Di-methylaminoethyl methacrylate containing 2% by weight t-butyl hydroperoxide.

EXAMPLE 25

Di-methylaminoethyl methacrylate containing 2% by weight cumene hydroperoxide.

EXAMPLE 26

A commercial type formulation containing 100 parts by weight di-methylaminoethyl methacrylate, about .02 part by weight hydroquinone, 0.3 part by weight benzoic sulfimide, 0.5 part by weight t-butyl hydroperoxide, .05 part by weight metabromotrifluro toluene and .025 part by weight ethoxyethoxyethoxypropylamine.

A small amount of each of Examples 24 through 26 was applied to a separate set of ⅜" steel bolts and then a steel nut was threaded over the thread of each bolt. Each nut and bolt combination was placed on a support surface, nut end up. Nuts were tested periodically for finger tightness, and it was found that Example 24 was finger tight in 210 minutes and each of Examples 25 and 26 were finger tight in 300 minutes.

At the end of 24 hours, a torque wrench was applied to the nut of the nut and bolt combination secured by each of Examples 24 through 26 and the torque required to loosen the nut was recorded. Examples 24, 25 and 26 required 175 inch lbs., 166 inch lbs., and 190 inch lbs., respectively, to loosen the nut and bolt.

Compositions were also prepared using di-t-butyl diperphthalate and t-butyl peracetate as catalysts in lieu of the hydroperoxides. Although these compositions performed adequately for some purposes, they were not of the preferred type. Some further examples were prepared using the dimethylaminoethyl methacrylate monomer with the commonly used peroxide catalyst benzoyl peroxide and the formulations were completely unacceptable for use as sealant compositions.

In still further examples, the procedures of the above examples are repeated substituting the following monomers for the dimethylaminoethyl methacrylate: dimethylaminoethyl ethacrylate, chloroacrylate or acrylate, methylaminoethyl methacrylate, cyclohexyl aminoethyl methacrylate, chloroacrylate, diisohexylaminoethyl ethacrylate, dihexylaminopropyl methacrylate, oleylaminoethyl, butylaminoethyl methacrylate or the like. In each case, the stability, 24-hour torque properties and room temperature cure time to finger tight are acceptable for many sealant uses.

All percentages given herein are percentages by weight unless otherwise indicated.

The foregoing detailed description is given for clearness of understanding only and no unnecessary limitations are to be understood therefrom, as some modifications will be obvious to those skilled in the art.

We claim:
1. A liquid sealant composition which is capable of storage as a liquid at room temperature but which sets up to an adherent solid polymer bond when contacted with and confined between closely facing metal surfaces at room temperature, said composition having a polymerizeable room temperature reactive acrylic monomer as said liquid consisting essentially of an acrylic ester of an alkylaminoalkyl alcohol and an amount of a catalyst system consisting essentially of t-butyl hydroperoxide maintaining said sealent in a normal stable liquid condition, but sufficient to set said monomer up as a solid polymer adhering to and filling the space between said surfaces within a period of a few hours in response to contact of the composition between said surfaces, wherein said acrylic ester has the formula:

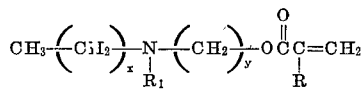

wherein $x$ is an integer 0 to 5, inclusive, $y$ is an integer 1 to 6, inclusive, R is selected from the class consisting of hydrogen, halogen, hydroxy, cyano, and lower alkyl, and $R_1$ is selected from the class consisting of hydrogen and $C_1$ to $C_6$ alkyl.

2. The composition of claim 1 wherein said acrylic ester is dimethyl aminoethyl methacrylate.

3. The composition of claim 1 wherein said acrylic ester is butylaminoethyl methacrylate.

4. The composition of claim 1 including an accelerator for accelerating polymerization by said catalyst.

5. A laminate structure comprising separate members having closely facing ferrous metal surfaces and a layer of the composition of claim 1 set between said surfaces and securing said members as a unit.

6. A method of adhering closely facing metal surfaces, which method comprises interposing between said surfaces the liquid composition of claim 1 and permitting said surfaces to stand at ambient conditions until said composition is set.

7. The method of claim 6 wherein said liquid composition sets up in less than about six hours.

References Cited

UNITED STATES PATENTS 2,138,763 11/1938 Graves.
3,249,656 5/1966 Kalinowski _____ 260—86.1

HARRY WONG, Jr., Primary Examiner

U.S. Cl. X.R.

117—132; 161—218; 204—159.22; 260—78.5, 80.81, 85.5, 86.1, 86.7, 88.7, 885